US006683838B2

United States Patent
Jutte

(10) Patent No.: US 6,683,838 B2
(45) Date of Patent: Jan. 27, 2004

(54) OPTICAL SCANNING DEVICE

(75) Inventor: Petrus Theodorus Jutte, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 280 days.

(21) Appl. No.: 09/969,010

(22) Filed: Oct. 2, 2001

(65) Prior Publication Data

US 2002/0060975 A1 May 23, 2002

(30) Foreign Application Priority Data

Oct. 8, 2000 (EP) .......................................... 00203492

(51) Int. Cl.[7] ................................................ G11B 7/00
(52) U.S. Cl. ............................ 369/112.24; 369/112.08; 369/44.23
(58) Field of Search ....................... 369/112.01, 112.08, 369/112.13, 112.2, 112.23, 112.24, 112.26, 44.11, 44.12, 44.23, 44.25, 44.28

(56) References Cited

U.S. PATENT DOCUMENTS

| 4,823,334 | A | | 4/1989 | Tanaka et al. ............... 369/112 |
|---|---|---|---|---|
| 5,467,335 | A | | 11/1995 | Braat .......................... 369/100 |
| 6,052,237 | A | * | 4/2000 | Opheij et al. ............. 369/44.23 |
| 6,147,956 | A | * | 11/2000 | Jutte et al. .............. 369/112.23 |
| 6,515,808 | B2 | * | 2/2003 | Saito ..................... 369/112.01 |

* cited by examiner

Primary Examiner—Muhammad Edun
(74) Attorney, Agent, or Firm—Michael E. Belk

(57) ABSTRACT

In an optical scanning device for scanning both a high-density, HD, record carrier (18) and a low-density, LD, record carrier (38), wherein a beam vergence-changing lens (34; 55) is arranged in the path of at least one of the LD (32) and HD beams (2) to adapt the vergence of the beam so that it has the required cross-section at the pupil of a conventional lens system (10, 14), this lens is made of plastics and has a focal length of between 6 and 9 mm. The temperature dependency of the scanning device is reduced thereby.

9 Claims, 2 Drawing Sheets

OPTICAL SCANNING DEVICE

The invention relates to an optical scanning device for scanning, in a first mode of operation, a first type of record carrier having a first information layer and a first transparent layer of a first thickness and for scanning, in a second mode of operation, a second type of record carrier having a second information layer and a second transparent layer of a second thickness, different from the first thickness, which device comprises a first radiation source for generating a first, HD, radiation beam in the first mode and a second radiation source for generating a second, LD, radiation beam in the second mode, an objective system designed for operation at a first set of conjugates to focus the HD beam on the first information layer in the first mode and for operation at a second, different, set of conjugates to focus the LD beam on the second information layer in the second mode wherein a beam vergence-changing lens is arranged in the path of at least one of the LD and HD beams.

The HD beam and the LD beam are herein understood to mean the beam used for scanning an information layer with a higher information density and an information layer with a lower information density, respectively.

A beam vergence-changing lens is understood to mean an auxiliary lens arranged in the path of a beam between the radiation source and the conventional lens system of a scanning device, which lens adapts the divergence or convergence of the beam in such a way that this beam has the required cross-section at the entrance pupil of the conventional lens system.

U.S. Pat. No. 4,823,334 discloses an optical scanning device wherein a collimating means for converting a divergent beam from a radiation source into a collimated beam incident on the objective system comprises a first lens element and a second lens element. The second lens element has a weak power so that collimating adjustment can be carried out with extreme accuracy by moving this element. This scanning device is intended to read/write a low-density record carrier and comprises only one radiation source which emits only one beam having one wavelength.

Generally, the transparent layer in optical record carriers is intended to protect the information layer from ambient influences, keeping dust particles, scratches etc at a sufficient distance from the information layer and it may provide mechanical support to the information layer. In the latter case, the transparent layer functions as a substrate for the information layer and the thickness of the transparent layer is a compromise between the thickness which is desired to give the record carrier the desired rigidity and the thickness which is desired in connection with the numerical aperture (NA) of the scanning beam incident on the transparent layer.

The NA of the objective system on the side of the record carrier is determined by the resolution the scanning device must have to read or write an information layer. The resolution of the scanning device, which resolution is inversely proportional to the minimum scanning spot size that can be formed by the device, is proportional to $NA/\lambda$, wherein $\lambda$ is the wavelength of the scanning beam. For scanning a record carrier with a larger information density, like the DVD, a scanning beam, hereinafter a HD (high density) scanning beam, should be used which has a higher NA and a smaller $\lambda$ than the scanning beam, hereinafter a LD (low density) scanning beam, used for scanning a record carrier with a lower information density. For record carriers with a larger information density, thus requiring a higher NA, it is often necessary to reduce the thickness of the information layer so as to decrease the influence of tilt of the record carrier with respect to the optical axis of the scanning device on the quality of the focus, or scanning spot. With the advent of novel record carriers having larger information densities, different types of record carriers having different thicknesses of the transparent layer will be on the market. A compatible scanning device will have to be able to scan the different types of record carriers, independently of the thickness of the transparent layer. Such a scanning device comprises a first and a second radiation source, usually diode lasers, for generating the HD beam having a wavelength of, for example 650 nm, and for generating the LD beam having a wavelength of, for example 780 nm. The objective system of a compatible scanning device for two types of record carriers should have a first set of conjugates for scanning the first type of record carrier and a second, different, set of conjugates for scanning the second type of record carrier. The first conjugate of an objective system is herein understood to mean the distance between the object plane, i.e. the emitting surface of the radiation source, and the first principal plane of the objective system. The second conjugate of the objective system is herein understood to mean the distance between the second principal plane of the objective system and the image plane, i.e. the plane of the information layer. Scanning a record carrier is herein understood to mean moving a scanning spot, formed by a scanning beam, and the information layer relative to each other for the purpose of reading, writing and/or erasing information.

In order to obtain two scanning beams having different NAs with one objective system in a compatible scanning device, an annular dichroic filter or diffraction element may be arranged in the radiation path before the objective system or on the first surface of this objective system. Such a dichroic filter or diffraction element transmits the HD scanning beam and blocks or diffracts the rim of the LD scanning beam, so that only the central part of the latter beam is passed through the objective system to the LD information layer. The LD scanning beam forms a scanning spot on the LD information layer, which scanning spot is broader than that formed by the HD scanning beam on the HD information layer. A better alternative, especially for a compatible scanning device wherein the LD scanning beam is used not only for reading, but also for recording an information layer, and wherein a maximal quantity of radiation from the radiation source should reach the information layer, is to arrange an additional lens in the LD beam path before the objective system. Such a beam vergence-changing lens, for example a pre-collimator lens, changes the vergence of the beam from the source in such a way that the LD beam fills only the central part of the objective system and the NA of this beam is such that, after passage through the objective system, the beam has the required image side NA.

The pre-collimator lens in known scanning devices is a glass lens. Such a lens is relatively expensive as compared with the other lenses of the scanning device, for example the objective lens which is made of plastics. Although a plastics pre-collimator lens would be preferred for cost reasons, this has not been implemented in known scanning devices, because the focal length of such a lens varies with temperature changes. This variation of the focal length results in a shift of the focus of the LD beam relative to the LD information layer. Since the pre-collimator lens is arranged in the path of the LD beam from the radiation source to the record carrier only, and not also in the path of the reflected LD beam from the record carrier to the detection system, this focus shift is interpreted by the focus detection system of the scanning apparatus as a shift of the objective system and the plane of the momentarily scanned part of the information layer relative to each other. The focus servosystem then moves the objective system and the information layer relative to each other, such that the focus error signal becomes zero, which results in a focus offset.

It is an object of the invention to provide an optical scanning device as described in the opening paragraph wherein the above-mentioned problems have been substantially reduced. This scanning device is characterized in that the beam vergence-changing lens is a plastic lens and has a focal length of between 6 and 9 mm.

The invention is based on the recognition that the defocusing due to temperature variations of a plastic lens is proportional to the design focal length of this lens and that for a design focal length of the order of 6 to 9 mm the remaining defocusing in the record carrier is fully acceptable. By a proper design of the device resulting in such a small focal length for the pre-collimator lens, it becomes possible to use a pre-collimator lens made of plastics with its costs advantage.

A first embodiment of the scanning device, wherein a beam vergence-changing lens is arranged in the path of the LD beam, is characterized in that this lens has a positive lens power.

This embodiment starts from a conventional scanning device wherein the HD beam has the proper vergence and fills the whole pupil of the conventional lens system. By means of the beam vergence-changing lens in the LD beam path, it is realized that this beam fills only the central part of said pupil.

A second embodiment of the scanning device is characterized in that a beam vergence-changing lens is arranged in the path of the HD beam, which lens has a negative lens power.

This embodiment starts from a scanning device wherein the LD beam has the proper vergence and fills the central part of the pupil of the conventional lens system. By means of the vergence-changing lens in the HD beam path, it is realized that this beam fills the whole pupil of said lens system.

The scanning device may also comprise a first beam vergence changing lens, having a positive lens power, in the LD beam and a second beam vergence-changing lens, having a negative lens power, in the HD beam.

The use of a beam vergence-changing lens with said small focal length results in a limited image field, which may be sufficient if the mutual positions of the optical elements can be controlled accurately. A scanning device, wherein larger position tolerances are required, is further characterized in that the beam vergence-changing lens has a concave entrance surface and a convex exit surface.

The entrance surface of the pre-collimator lens is the surface facing the second radiation source. Use of a concave/convex pre-collimator lens results in a larger image field, so that the requirements for the mutual positions of the optical elements can be lessened.

An embodiment of the optical scanning device, wherein the path of the beam provided with the beam vergence-changing lens comprises a beam-dividing diffraction element, is preferably further characterized in that the beam-vergence-changing lens is arranged between this diffraction element and the relevant radiation source.

The diffraction element splits the beam from the radiation source into a main beam, i.e. the scanning beam, and two secondary beams for tracking purposes. By arranging the pre-collimator lens before the diffraction element, instead of behind this element, this lens can be positioned sufficiently close to the radiation source, which is preferred in view of the short focal length. Moreover, it is better ensured that the secondary beams fall within the entrance pupil of the objective system.

The scanning device may be further characterized in that in the path of at least one of the LD and HD beams a beam shaper is arranged as a first element facing the relevant radiation source.

With such a beam shaper, the diode laser beam having an elliptical cross-section can be converted in a beam having a circular cross-section, without loss of radiation. An effective and small beam shaper, which can be arranged close to a diode laser, is disclosed in U.S. Pat. No. 5,467,335. By providing a beam shaper in the compatible scanning device, the intensity of the LD beam is increased, so that this beam is better suitable for writing information.

These and other aspects of the invention are apparent from and will be elucidated by way of example with reference to the embodiments described hereinafter and illustrated in the accompanying drawings. In the drawings.

Figure 1:
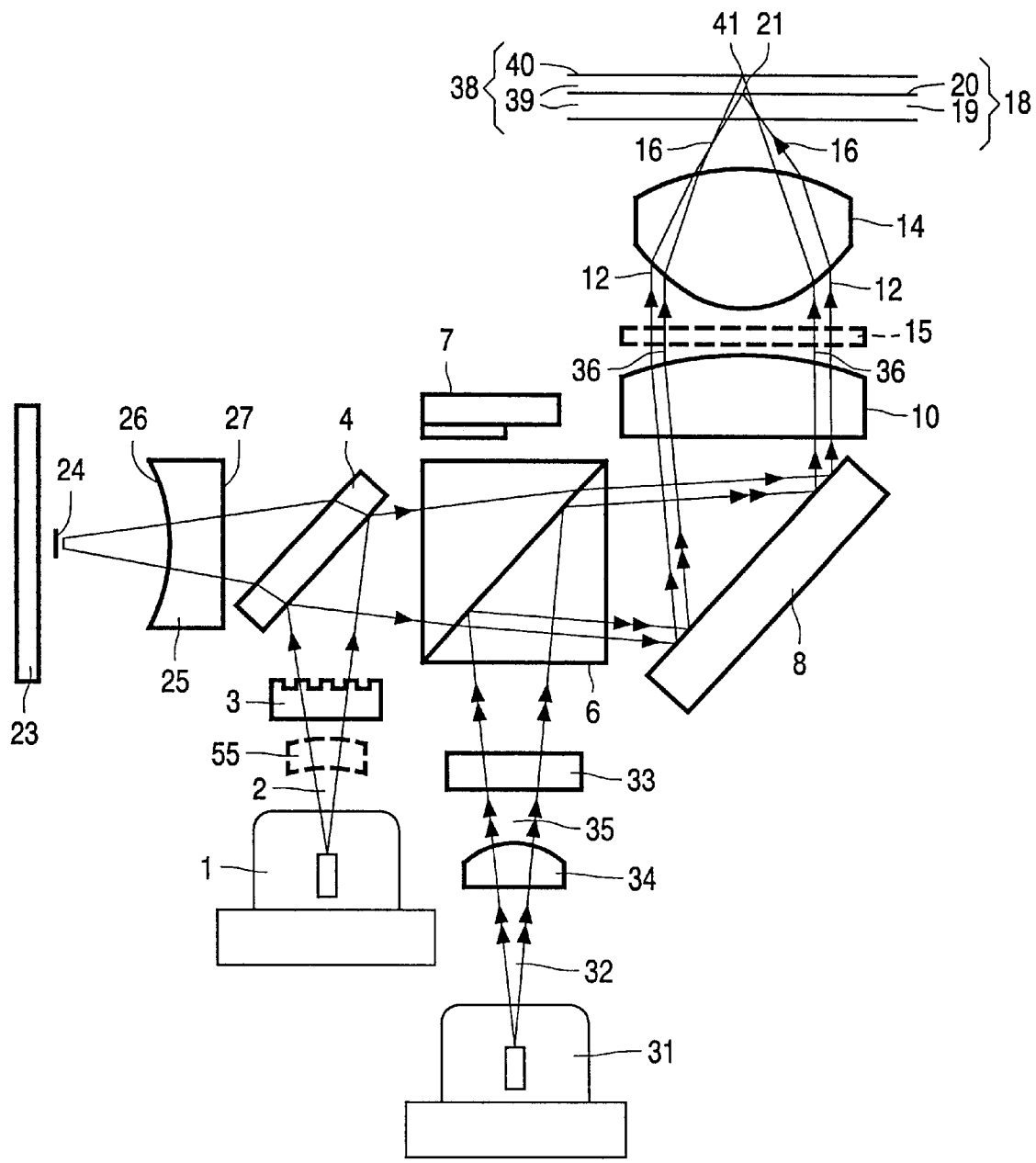
FIG. 1 shows a compatible scanning device comprising two diode lasers and a pre-collimator lens in the path of the LD beam.

FIG. 1 shows a scanning device, which has a first optical path for reading and possibly writing a first type of record carrier at a short wavelength and a second optical path for reading and writing a second type of record carrier at a long wavelength. The first type of record carrier may be a digital versatile disc (DVD) and the first wavelength is, for example, 650 nm whereas the second type of record carrier may be a writable compact disc (CDW) and the second wavelength is, for example, 780 nm.

The first optical path comprises a radiation source 1, e.g. a semi-conductor, or diode, laser, which emits a divergent radiation beam 2, the HD beam, of a first wavelength, e.g. 650 nm. A partially transparent mirror 4 reflects a part of the beam 2 towards a dichroic prism 6. A diffraction grating 3 may be arranged between the diode laser 1 and the mirror 4, which grating forms a non-diffracted main, or scanning, beam and two diffracted beams. The diffracted beams are used for tracking purposes. The Figure shows only the non-diffracted beam for the sake of clarity. The three radiation beams, briefly called the radiation beam 2, are reflected by the partially-transparent mirror 4 towards the dichroic beam splitter 6 which has a high transmission for the first wavelength and passes beam 2 with a low attenuation. A reflector 8 reflects the beam 2 towards a collimator lens 10, which converts the divergent beam 2 into a collimated beam 12. This beam passes through an objective lens system 14, represented by a single lens element, which changes collimated beam 12 to a converging beam 16 for scanning a record carrier 18. The objective lens system may consist of a single optical element, as shown in the Figure, but it may also comprise two or more optical elements.

The record carrier is of a first, high density, type and comprises a transparent layer 19 having a thickness of e.g. 0.6 mm, and an information layer 20, on which converging beam 16 comes to a focus, or scanning spot, 21. The radiation reflected from information layer 20 returns along the optical path of beams 16 and 12 and is converged by the collimator lens 10. The reflected beam passes through dichroic beam splitter 6 and beam splitter 4 and is converged to a detector spot 24 on a detection system 23. This system converts the beam into electric detector signals. An information signal, representing information stored in information layer 20 and controlling signals for positioning focus 21 in a direction normal to the information layer 20 (focus control), and in a direction normal to the track direction (tracking control), can be derived from the detector signals.

The focus control signal can be generated by means of the astigmatic method. As the beam splitter 4 is positioned at an acute angle relative to the chief ray of the reflected and convergent beam, the beam splitter 4 introduces astigmatism in this beam. The detection system comprises a quadrant detector by means of which the shape of the cross-section of the astigmatic beam in the plane of the detection system can be detected. This shape is determined by the position of the focus 21 relative to the information layer 20.

Lens 25 may be arranged between the beam splitter 4 and the detection system. This lens may have a spherical concave surface 26 at the side of the detection system and may be used as a negative servolens to set the focus of the beam. The surface 27 of lens 25 at the side of the beam splitter may be shaped cylindrically so that this lens has also a cylindrical lens function. This lens function can be used if the astigmatism introduced by the skew beam splitter 4 is too small. It is also possible that lens 25 is only a spherical lens or only a cylindrical lens. If necessary, an element which corrects for the coma introduced by the beam splitter 4 may be arranged instead of, or in addition to, such a lens.

The optical path for scanning the second type of record carrier comprises a radiation source 31, e.g. a semiconductor laser, which emits a divergent radiation beam 32, the LD beam, of a second wavelength, e.g. 780 nm. A grating 33 may be arranged in its optical path to form three beams in a way similar to grating 3. The dichroic beam splitter 6 reflects most, for example 90%, of the radiation of the LD beam and transmits the remaining radiation of this beam towards an additional detector 7. This detector, which is called a feed-forward sensor, supplier an output signal that is proportional to the intensity of the beam from the diode laser 31 and can be used to control the intensity of this beam. The LD beam reflected by this prism 6 follows the same path as the HD beam to arrive at the second type of record carrier 38. This record carrier comprises a transparent layer 39, having a thickness of e.g. 1.2 mm, and an information layer 40.

Record carriers 18 and 38 are drawn as a single, two-layer record carrier having a partially transparent information layer 20, but they may also be separate single-layer record carriers having transparent layers of different thickness.

The LD beam should be brought to a focus, or scanning spot, 41 on the information layer 40. The objective system 14 is designed so as to operate in the first mode at a first set of conjugates, at which the HD beam from the source 1 is focused on information layer 20, and in the second mode at a second set of conjugates, at which the LD beam from the source 31 is focused on information layer 40. Radiation reflected from information layer 40 returns on the path of the LD beam to the record carrier 38.

Further beam splitter, not shown, may be arranged between the prism 6 and the diffraction grating 33 so as to reflect the reflected radiation towards a further detection system, not shown. This detection system for the LD beam has the same function as the detection system 23 for the HD beam. Preferably, the radiation of the reflected LD beam passing through the beam splitter 6 and incident on the detection system 23 is used for reading and controlling of the position of the scanning spot 41 on the information layer 40. This LD radiation is, for example 10% of the total radiation of the reflected LD beam. In this way, a second detection system is no longer needed and the scanning device is simplified. The intensity of the LD beam incident on the detection system can be increased, if necessary, by adding some polarization sensitivity to the beam splitter 6 and by arranging a quarter-wave plate 15 in the path of the LD beam between this beam splitter and the objective system, preferably between the collimator lens 10 and the objective system. On its way to and from the record carrier 38, the LD beam passes this plate twice, so that its direction of polarization is rotated through 90° relative to the direction of polarization of the LD beam from the diode laser 3. Due to this polarization rotation, a larger part of the LD beam reflected by the record carrier 38 passes through the beam splitter 6, while the intensity of the LD beam incident on the information layer is not decreased.

The objective system 14 is designed for the first mode to converge collimated HD beam 12 of the first wavelength through a transparent layer 19 to focus 21 on information layer 20. The spherical aberration incurred by the converging beam 16 in passing transparent layer 19 is compensated in the objective system 14. The objective system complies with the sine condition. If the transparent layer 19 is not present, the objective system should not be compensated for spherical aberration. In the second mode, the LD beam passes through transparent layer 39 having a thickness which differs from that of transparent layer 19. The objective system is not compensated for the spherical aberration incurred by the thickness of the transparent layer 39. However, it has been established that the spherical aberration is mainly caused by the outer annular area of the objective system, through which the border rays of the LD beam pass. In a small area around the focus 41, the wavefront of the converging LD beam, showing aberrations, is spherical in the central part of the objective aperture. The scanning spot 41 comprises a small central area with large intensity formed by rays emanating from the central part of the objective aperture and a larger annular area, around the central area, with smaller intensity formed by rays emanating from the outer area of the objective aperture. The quality of the central part of the scanning spot is sufficient for scanning the information layer 40 and a good scanning spot can be obtained by using only rays emanating from the central part of the objective aperture for forming this spot. A dichroic absorbing ring or a deflecting ring could be arranged before or on the objective system, which ring absorbs or deflects radiation of the LD beam and passes radiation of the HD beam. The objective system then transmits the whole HD beam but only the central part of the LD beam. In this way, a considerable part of the intensity of the LD beam is lost and the remaining intensity of the scanning spot 41 is too small to record information by means of this spot.

A better alternative, especially for a compatible scanning device which should be able to record information in the second information layer, is to arrange a positive lens 34 in the path of the LD beam only, as shown in FIG. 1. This lens converts the divergent beam 32 from the source 31 into a less divergent beam 35 and may be called a pre-collimator lens. The LD beam 36 is converted by the collimator lens 10 into LD beam 36, which fills only the central part of the aperture of the objective system. In this way, no or only an acceptable amount of spherical aberration is introduced into the beam, while the intensity of this beam is large enough to write information in the information layer 40.

In order to reduce the costs of the additional lens 34, this lens is made of plastics. However, a major problem of such a lens is that its focal length varies with temperature variations. In the scanning device, this would result in a shift of the LD beam focus relative to the information layer 40, so that the scanning spot 41 becomes too broad. This would result in crosstalk between neighbouring information tracks, in so-called jitter, e.g. time errors in the information signal read out and in decreased signal strengths of the information and tracking signals during reading of information. During writing of information, a too broad spot would result in formation of information areas, which are too broad and not well defined. The scanning device comprises a focus servo-system to keep the focal of the scanning beam in the information layer when a deviation occurs between the focus plane of the scanning beam and the information plane to be scanned. Such a deviation may be due to a change in the distance between the objective system and the record carrier or due to warping of the record carrier. The focus servosystem uses the scanning beam reflected by the record carrier and incident on the detection system to detect said deviation. The plastic lens is arranged only in the path of the LD beam from the source 31 and no similar element, which could compensate for the temperature behaviour of the plastic collimator lens, is arranged in the path of the reflected beam to the detection system. This means that temperature variations in the pre-collimator lens will result in a focus offset.

To obviate this problem, a plastic pre-collimator lens with a small focal length is used. In a scanning device, wherein the pre-collimator lens is a planoconvex lens, the defocusing $\Delta Z$ for a temperature variation $\Delta T$ is approximated by:

$$\frac{\Delta Z}{\Delta T} = \frac{(1-m)^2 \cdot f}{(2 \cdot mc^2) \cdot (n-1)} \cdot \frac{\Delta n}{\Delta T} \quad (1)$$

In this equation:
  m is the magnification of the pre-collimator lens;
  f is the focal length of this lens;
  n is the refractive index of the material of this lens, and
  mc is the magnification of the combination of collimator lens 10 and objective system 14 for the HD beam and is given by the quotient of the NA of the objective system 14 and the NA of the collimator lens 10, i.e. by:

$$mc = \frac{NA_{,obj(HD)}}{NA_{,coll(HD)}} \quad (2)$$

Equation (1) demonstrates that the defocusing $\Delta Z$ in the record carrier 38 is proportional to the focal length of the pre-collimator lens, and that the defocusing decreases with a decreasing focal length of the pre-collimator lens.

The requirement that the full aperture of the objective system, i.e. $NA_{,obj(HD)}$, is used for the HD beam and only a smaller central part of this aperture, i.e. $NA_{,obj(LD)}$, is used for the LD beam results in a collimator lens NA for the LD beam, which is given by:

$$NA_{,coll(LD)} = NA_{,coll(HD)} \times \frac{NA_{,obj(LD)}}{NA_{,obj(HD)}} \quad (3)$$

The pre-collimator lens is used to increase the amount of radiation from the diode laser 31 which falls within the $NA_{,coll(LD)}$. Without such a pre-collimator lens, the amount of diode laser radiation within this aperture would be too low to write information, because of the divergence of the diode laser beam and the asymmetry in this divergence. The pre-collimator lens is a converging lens with a magnification m and ensures that the laser beam captured by the $NA_{,coll(LD)}$ gets a larger aperture. This larger aperture may be called the coupling aperture $NA_{,coupl}$. The required value for this coupling NA, which value is determined by a/o the laser beam divergence, determines the required magnification m of the pre-collimator lens. This magnification is given by:

$$m = NA_{,coupl} / NA_{,coll(LD)} \quad (4)$$

In a practical embodiment of the scanning device, $NA_{,coll(HD)}=0.088$ and $NA_{,obj(HD)}=0.6$, so it follows from equation (2) that mc=6.8. Furthermore $NA_{,obj,(LD)}=0.5$, so that it follows from equation (3) that $NA_{,coll(LD)}=0.073$. If the laser beam 32 has a transversal divergence of 8° and a lateral divergence of 20°, a value for the coupling aperture $NA_{,coupl}=0.135$ is required to illuminate the $NA_{,coll(LD)}$ with sufficient LD beam intensity, without coupling too many, disturbing, border rays in this aperture. This means that the pre-collimator lens should have a magnification m of 0.135/0.073=1.85. If the refractive index of the pre-collimator lens n=1.57 and the variation with temperature of this lens $\Delta n/\Delta T=-12.10^{-5}$, for $\Delta T=40°$ C., the following values for $\Delta Z$ can be derived from equation (1) for the different values of f:

| f(mm) | $\Delta Z$ ($\mu$m) | WA (m$\lambda$ rms) |
|---|---|---|
| 6 | 0.39 | 18 |
| 7 | 0.46 | 21 |
| 9 | 0.59 | 26 |
| 12 | 0.80 | 36 |

The table also the states wavefront aberration WA, also called $W_{20}$ in optics literature, corresponding to the $\Delta Z$ values. The values of WA can be derived from the $\Delta Z$ values via:

$$W_{20} = \frac{0.5 \cdot \Delta Z \cdot (NA)^2}{\lambda \cdot \sqrt{12}}$$

It will be from the above values clear that the focal length of the pre-collimator lens should be chosen as small as possible. For the above embodiment, a pre-collimator lens with a focal length f of between 6 and 9 mm and a magnification m=1.85 should be chosen. Preferably, this lens has a focal length f=6.7 mm. This is considerably smaller than the focal length f=15 nm of the pre-collimator in a known scanning device.

Because of its small focal length, the pre-collimator lens is arranged close to the diode laser 31. Preferably, the diffraction grating 33 is arranged after the pre-collimator lens, as shown in FIG. 1, instead of before this lens, as is the case in the known scanning device.

Figure 2:
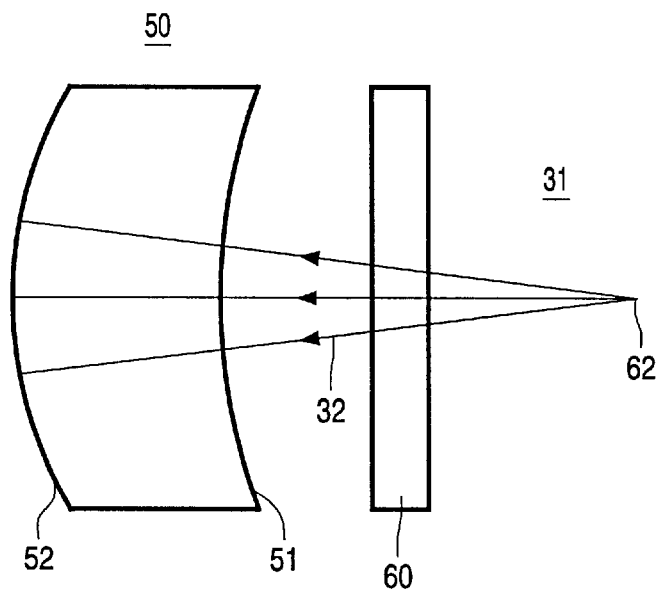
FIG. 2 shows an embodiment of the pre-collimator lens.

The image field of the scanning device should have a certain extent so that a scanning spot of good quality is formed not only on the optical axis, but also in the neighbourhood of this axis. The scanning spot can then be displaced in the image field, for example for tracking purposes. For such an image field, it is desired that the focal length of the pre-collimator lens is not too small, in view of the tolerances for the axial position of this lens. According to a further aspect of the invention, the pre-collimator lens is a concave-convex lens. FIG. 2 shows a cross-section of such a lens 50 and the cover glass 60 of the diode laser 31. Beam 32 emitted by the laser seems to come from a point 62 within the laser. The lens surface 51 facing the diode laser is concave and the opposite surface is convex. The convex surface has a stronger curvature, i.e. a smaller radius of curvature, than the concave surface, so that the lens is positive, i.e. it has a magnification m which is larger than one, for example m=1.85. The lens is very suitable for a pre-collimator lens in the scanning device, because it has a small focal length f of the order of 6.7 mm and provides an image field with a diameter of the order of 0.5 mm for wavefront aberrations of less than 25 m$\lambda$ rms.

In the embodiment described above, the HD beam has such an aperture that it fills the aperture of the objective system, and the LD beam is adapted in such a way that it fills only the central portion of the objective pupil. However, it is possible that the two laser beams have such an aperture that they fill only the central portion of the objective pupil. In that case, the aperture of the HD beam should be increased to such an extent that this beam fills the whole pupil of the objective system. Instead of a positive pre-collimator lens in the path of the LD beam, a negative lens, i.e. having a magnification of less than 1, should be arranged in the path of the HD beam. According to the invention such a lens 55, shown in FIG. 1 by means of broken lines, has a small focal length f. Preferably, this lens is a concave convex lens so that the image field is sufficiently large. The lens 55 may have a similar shape as the lens shown in FIG. 2. However, the concave surface has a stronger curvature than the convex surface, so that the lens is negative instead of positive.

It is also possible to arrange a first beam vergence-changing element in the form of a positive lens in the path of the LD beam and a second beam vergence-changing element in the form of a negative lens in the path of the HD beam. Then the object of irradiating the whole pupil of the objective with the HD beam and only the central portion of this pupil with the LD beam is achieved by the joint action of two vergence-changing elements. These two elements may have a weaker vergence-changing power than in the case where only one such element is used. The use of two vergence-changing elements may help to lessen the requirements to be set to the coating of the beam splitter 6. The behaviour of this coating depends on the angle of incidence of the beams hitting the coating. By using two beam vergence-changing elements, the beam splitter is easier to manufacture.

In a scanning device, wherein a diode laser is used as a radiation source, a beam shaper can be arranged close to the diode laser to increase the intensity of the scanning beam. A diode laser emits a beam whose angular aperture in a plane parallel to its active layer, known as the lateral plane, is smaller than the angular aperture in a plane perpendicular to the active layer, known as the transversal plane. At some distance from the diode laser, e.g. in the far field of the diode laser, the beam of such a diode laser has an elliptical cross-section. In a scanning device for scanning an information layer, a round and small, preferably diffraction-limited, scanning spot should be used. To this end, the objective system, by means of which the scanning spot is formed, must be filled with a radiation beam having a circular cross-section. If the objective system is illuminated by a diode laser beam which has such elliptical cross-section dimensions at the entrance pupil of this objective system that the aperture is filled in the direction of the small axis of the ellipse, an amount of radiation will fall outside the pupil in the direction of the long axis. Such a loss of radiation can be avoided by arranging a beam shaper, which converts the elliptical beam into a round beam, between the diode laser and the objective system. An attractive beam shaper is disclosed in U.S. Pat. No. 5,467,335.

Figure 3:
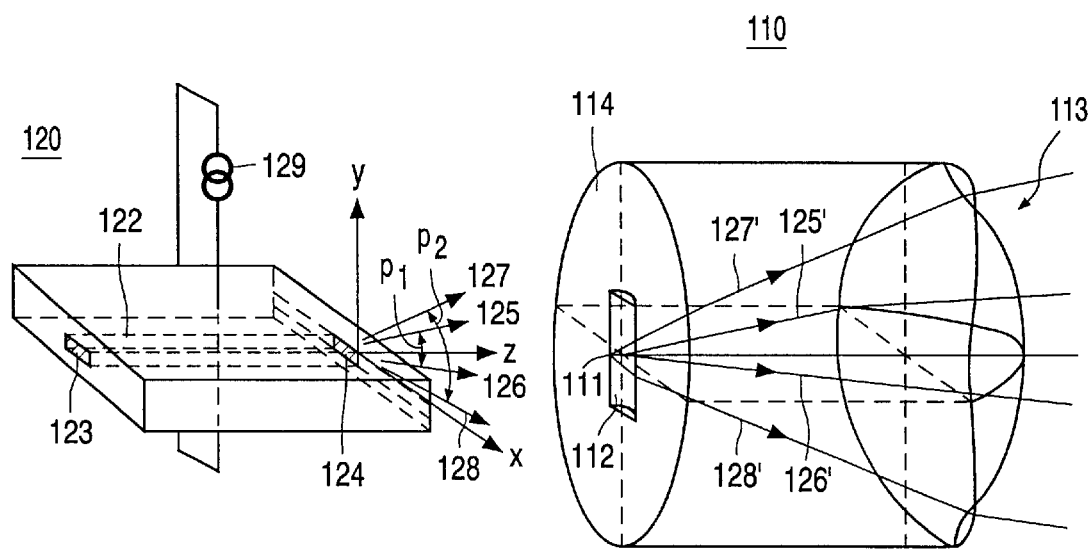
FIG. 3 shows an embodiment of a beam shaper.

FIG. 3 shows this beam shaper 110, in which a lens element having a cylindrical entrance surface 112 and a toroidal exit surface 113 can be arranged close to the diode laser 120. This laser comprises a plurality of differently doped layers of which only the strip-shaped active layer 122 is shown. Two partially transparent mirror facets 123 and 124 bound this strip so that the laser radiation, which is generated when an electric current from a current source 129 is passed through the laser, can leave the active strip 122. The cross-section, in the XY plane of the three-axis system of co-ordinates XYZ, of the active strip 122 and of the front facet 124 is rectangular. Due to this shape, the beam emitted by the diode laser is not symmetrical but has an aperture angle $\beta_1$ in the XZ plane parallel to the active strip 122, i.e. the lateral plane, which aperture angle is smaller than the aperture angle $\beta_2$ in the YZ plane, i.e. the transversal plane. The border rays of the laser beam in the lateral plane are denoted by reference numerals 125 and 126 and those in the transversal plane are denoted by reference numerals 127 and 128. The entrance surface has the shape of part of a cylinder whose cylindrical axis is parallel to the Y-axis. For the rays in the YZ plane, the entrance surface is a flat interface between, for example, air and the lens medium, which has a refractive index n, so that these rays are deflected towards the Z-axis to an extent which is determined by n. In other words, the entrance surface 112 introduces an angular magnification of 1/n in the YZ plane, which is a reduction. The entrance surface 112 has a curvature R in the XZ plane and this surface introduces an angular magnification of n. The exit surface 113 of the beam shaper 110 has such a radius of curvature $R_1$ in the transversal plane and is arranged at such a Z position that its centre of curvature substantially coincides with the image of the laser facet 124, formed by the surface 112. The surface 113 transmits the rays in the transversal plane in a non-refracted form and the angular magnification in this plane is substantially equal to 1. In the lateral plane, the exit surface has such a radius of curvature $R_2$ that its centre of curvature coincides with the virtual image, formed by the surface 112, of the centre of the laser facet 124, so that the angular magnification in this plane is approximately 1. Since the two virtual images formed by the entrance surface 112 are located at different positions along the Z-axis, the exit surface 113 should have a slightly toroidal shape so as to combine these images to one image. Toroidal is understood to mean that the radius of curvature of the surface in the lateral plane differs from that in the transversal plane. This is illustrated in FIG. 3, by means of the non-coplanar peripheral curve of the exit surface. For further details and embodiments of the beam shaper of FIG. 3 reference is made to U.S. Pat. No. 5,467,335.

In the scanning device of the present invention, a beam shaper can be arranged in the LD beam between the diode laser 31 and the pre-collimator lens 34 to further increase the energy in the scanning spot 41. This beam shaper may be similar to that of FIG. 3. Such a beam shaper may also be arranged in the path of the HD beam between the diode laser 1 and the diffraction grating 3, or the lens 55 if this lens is present. Such a beam shaper is particularly advantageous in a scanning device which should be suitable to write information in a high-density information layer.

The beam shaper of FIG. 3, which may be arranged in one or both of the LD and HD beams, is a thick lens element. Instead of such a lens beam shaper, also a diffraction beam shaper, in the form of a diffraction grating or holographic element, may be used. The beam shaping is then performed by diffraction, instead of by refraction. If such a diffraction beam shaper is to be used in a radiation path that comprises a vergence-changing lens, it may be integrated with this lens. This means that the entrance surface of the lens is provided with a diffraction structure acting as a beam shaper.

What is claim is:

1. An optical scanning device for scanning, in a first mode of operation, a first type of record carrier having a first information layer and a first transparent layer of a first thickness and for scanning, in a second mode of operation, a second type of record carrier having a second information layer and a second transparent layer of a second thickness different from the first thickness, which device comprises a first radiation source for generating a first, HD, radiation beam in the first mode and a second radiation source for generating a second, LD, radiation beam in the second mode, an objective system designed for operation at a first set of conjugates to focus the HD beam on the first information layer in the first mode and for operation at a second, different, set of conjugates to focus the LD beam on the second information layer in the second mode, wherein a beam vergence-changing lens is arranged in the path of at least one of the HD and LD beams, characterized in that the beam vergence-changing lens is a plastics lens and has a focal length of between 6 and 9 mm.

2. An optical scanning device as claimed in claim 1, wherein a beam vergence-changing element is arranged in the path of the LD beam, characterized in that this lens has a positive lens power.

3. An optical scanning device as claimed in claim 1, characterized in that a beam vergence-changing lens is arranged in the path of the HD beam, which lens has a negative lens power.

4. An optical scanning device as claimed in claim 1, characterized in that the beam vergence-changing lens has a concave entrance surface facing the first and second radiation source and a convex exit surface.

5. An optical scanning device as claimed in claim 1, wherein the path of the beam provided with the beam vergence-changing lens comprises a beam-dividing diffraction element, characterized in that the beam-vergence changing lens is arranged between this diffraction element and the relevant radiation source.

6. An optical scanning device as claimed in claim 1, characterized in that in the path of at least one of the LD and HD beams a beam shaper is arranged as a first element facing the relevant radiation source.

7. An optical scanning device as claimed in claim 6, wherein the beam shaper is a lens element having a cylindrical entrance surface and a toroidal exit surface.

8. An optical scanning device as claimed in claim 6, characterized in that the beam shaper is a diffraction element.

9. An optical scanning device as claimed in claim 8, characterized in that the diffraction structure of the beam shaper is integrated with the entrance surface of the relevant beam vergence-changing lens.

* * * * *